Patented June 22, 1937

2,084,361

UNITED STATES PATENT OFFICE 2,084,361

METAL CLEANING COMPOSITION

Byron M. Vanderbilt, Chicago Heights, Ill., assignor to Victor Chemical Works, a corporation of Illinois No Drawing. Application December 17, 1934, Serial No. 757,974

16 Claims. (Cl. 148—8)

This invention relates to a metal cleaning composition, and more particularly to metal cleaning compositions comprising esters of phosphoric acid.

Orthophosphoric acid has been considerably used heretofore for the removal of oil and rust from ferrous metals, frequently in admixture with organic solvents such as aliphatic alcohols, the latter serving the purpose of emulsifying or dissolving adhering oil or grease, while the phosphoric acid removed the rust.

In this connection it has been recognized that the higher alcohols such as butyl and amyl are superior as grease solvents to the lower alcohols, but their use has been limited because of their low miscibility or solubility in aqueous phosphoric acid solutions.

It has now been discovered that these difficulties may be avoided, and a superior degreasing and derusting solution prepared by reacting on the primary alcohols with pyro or metaphosphoric acids, or a combination thereof, to form monophosphoric acid esters. The pyro and metaphosphoric acids are herein referred to as dehydrated phosphoric acids.

The reaction between the pyrophosphoric acid and the primary aliphatic alcohols is believed to take place substantially according to the following equations:

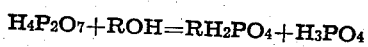

Thus, for every mol. of the monophosphoric acid ester formed in the reaction with pyrophosphoric acid, there is also formed one mol. of orthophosphoric acid.

In the case of metaphosphoric acid, the reaction apparently is according to the following equation:

It is believed that the above reactions substantially represent the net results of the reactions, but it is not known whether intermediate reactions occur with subsequent hydrolysis to form the mono esters, or to what extent the product is contaminated with traces of esters of the dehydrated phosphoric acids.

The reaction products have degreasing and derusting characteristics which are similar in the two cases. Apparently the reaction proceeds in accordance with the above equation to yield substantially the mono esters. The temperature in all cases should be kept sufficiently low to avoid charring and possible ether formation.

Several examples of the preparation of metal cleaning and derusting solutions in accordance with the invention are as follows:

1. 223 grams of pure butanol were placed in a one liter three neck flask equipped with stirrer, thermometer, and external cooling means. An equal molecular amount, 534 grams, of pyrophosphoric acid was added in a thin stream under good agitation at a temperature below 35° C. The reaction was exothermic, but not extremely so, running tap water sufficing as a cooling means. The two reactants mixed readily to give a yellow solution. When the addition of the acid was complete, the solution was allowed to stand from 24–48 hours when a brown syrupy product was obtained. The product was miscible in water and could be used in dilute solution as a cleaning and derusting agent for ferrous metals.

2. 88 grams of normal amyl alcohol were reacted with an equal molar weight of pyrophosphoric acid (178 grams) in a manner similar to the above experiment except that it was possible to increase the reaction temperature to about 50° C. without decomposition. The reaction mixture may be stored at a temperature ranging between 40 and 60° C. for 10 to 48 hours in order to complete the reaction. A dark brown viscous liquid was obtained with a specific gravity of 1.323. The liquid could be diluted with 9 parts of water without becoming turbid, and even at this dilution was an excellent degreasing and derusting agent.

3. 176 grams of refined "fusel oil" which was composed of nearly pure active amyl and iso-amyl alcohols, was reacted with 392 grams of pyrophosphoric acid at a temperature below 40° C. The reaction mixture was then allowed to age at about 60° C. for 18 hours. The product was similar to that prepared above except that it could only be diluted with 7 parts of water before cloudiness occurred.

4. Crude fusel oil containing about 60–65% of amyl alcohols with the rest water and lower alcohols was also used, and resulted in a fairly satisfactory product except that it could not be used in dilution greater than about 1 part to 3 parts of water.

5. 35 grams of normal butanol were added to 40 grams of 88% metaphosphoric acid and stirred at 40° C. until well mixed. On standing at 40° C. for for 12 hours one phase was obtained. The product was soluble to maximum dilution with 6 volumes of water, and the aqueous solution could be diluted with 75% phosphoric acid solution without precipitation of the ester.

6. 40 grams of 88% metaphosphoric acid and 36 grams of refined fusel oil were mixed at 40° C. and heated at 40° C. for 48 hours. The product was soluble in water to the extent of 1 part in 7 parts of water. The aqueous solution was a fairly good metal cleaner provided the metal was only slightly rusty. The product could be diluted with orthophosphoric acid without precipitation.

The reaction products of pyrophosphoric acid and methanol, ethyl alcohol, and normal propyl alcohol were also prepared, but these products were not as good as metal cleaning and derusting agents as the reaction products of pyrophosphoric acid and the primary amyl and butyl alcohols.

Pyrophosphoric acid will react readily with any of the primary alcohols containing less than 7 carbon atoms and with many of the organic compounds containing the primary alcohol group, as glycerine, glycol, butyl ether of ethylene glycol, to form water soluble reaction products with metal cleaning and derusting properties. The higher alcohols such as capryl, lauryl, and cetyl alcohols do not readily react under the above conditions.

In the reactions of pyrophosphoric and metaphosphoric acids with butanol, it is desirable to keep the temperature below 50° C. to prevent charring and formation of ether. In the case of the amyl alcohols the reaction temperature should be held under 60° C. with pyrophosphoric acid and 50° C. with metaphosphoric acid.

The reaction of the primary alcohols with pyro and metaphosphoric acids is clearly indicated by numerous tests to be definite chemical combinations and no admixtures.

It is preferred to use the reaction product of pyrophosphoric and metaphosphoric acids with primary butyl and amyl alcohols as metal cleaning solutions. These products may be diluted with orthophosphoric acid to suit the conditions under which they are to be used. For example, if the metals to be cleaned are contaminated with large quantities of oil or grease the concentration of the butyl or amyl phosphate should be high, while on the other hand, if considerable rust is to be removed the phosphoric acid concentration should be high, additional orthophosphoric acid being added if necessary. However, this is usually not necessary with the pyrophosphoric acid reaction product because of the formation of free orthophosphoric acid in the reaction. In the case of the alcohol metaphosphoric acid product, it is often desirable to add orthophosphoric acid.

In some cases it may be desirable to increase the oil or grease removing capacity by adding to the reaction products mentioned above, one of the lower water soluble alcohols such as methyl, ethyl, or propyl alcohol. Such a product would have all of the advantages due to the ester in addition to the oil emulsifying power of the lower alcohols.

One of the primary uses to which the solutions may be applied is that of cleaning automobile bodies and the like prior to their being painted. The metal parts may be dipped or sprayed with a relatively dilute aqueous solution of the product preferably containing about 15–25% of the reaction product. This solution is allowed to remain on the metal a few minutes or sufficiently long to remove the rust and oil, and is then either washed or wiped thoroughly before applying paint.

In using the above solutions as rust and grease removing compositions, an additional advantage is accomplished in that the resultant metal surface is rust-proofed to a considerable degree by the formation of a thin phosphate coating.

While the above description has been largely confined to a discussion of a composition for the removal of oils and rust from ferrous metals, it has been found that such compositions also remove oil and corrosion matter from metals such as tin, brass and copper.

The foregoing detailed description is given for clearness of understanding only, and no unnecessary limitations should be understood therefrom, but the appended claims should be construed as broadly as permissible in view of the prior art.

What I regard as new and desire to secure by Letters Patent is:

1. A metal cleaning solution comprising the water soluble acid esteric reaction product of a dehydrated phosphoric acid and an organic compound containing a primary alcohol group.

2. A metal cleaning composition comprising the acid esteric reaction product of a dehydrated phosphoric acid and butanol.

3. A metal cleaning composition comprising the acid esteric reaction product of a dehydrated phosphoric acid and a primary amyl alcohol.

4. A metal cleaning composition comprising an ester of a primary alcohol and a phosphoric acid, together with orthophosphoric acid.

5. A composition as set forth in claim 4, in which the solution comprises a major proportion of water.

6. A metal cleaning composition comprising an ester of a primary alcohol and a phosphoric acid, together with a water soluble aliphatic alcohol.

7. A metal cleaning composition comprising an ester of a primary alcohol and a phosphoric acid, together with a water soluble aliphatic alcohol and orthophosphoric acid.

8. A metal cleaning composition comprising the phosphoric reaction product of a primary aliphatic alcohol and a mixture of metaphosphoric and pyrophosphoric acids.

9. In the formation of a metal cleaning solution comprising phosphoric acid and the esterified reaction product of meta and pyrophosphoric acids and a primary aliphatic alcohol, the step of controlling the ratio of phosphoric acid to the esterified product by controlling the ratio of meta and pyrophosphoric acids to each other.

10. A metal cleaning solution comprising the phosphoric reaction product of fusel oil and a dehydrated phosphoric acid.

11. The method of forming a metal cleaning solution which comprises mixing a molecularly dehydrated phosphoric acid with an organic compound containing a primary alcohol group whereby they react to form an acid ester product.

12. The method of forming a metal cleaning solution which comprises mixing a molecularly dehydrated phosphoric acid with a primary aliphatic alcohol containing less than seven carbon atoms whereby they react to form an acid ester product.

13. The method as set forth in claim 12, in which reaction is carried out at a low temperature.

14. The method of forming monophosphoric acid esters which comprises mixing a molecularly dehydrated phosphoric acid with an organic compound containing a primary alcohol group whereby they react to form an acid ester.

15. A metal cleaning composition comprising an ester of an organic compound containing a primary alcohol group and a phosphoric acid, and orthophosphoric acid.

16. A metal cleaning composition comprising orthophosphoric acid and an ester of a primary alcohol containing from 4 to 7 carbon atoms and a phosphoric acid.

BYRON M. VANDERBILT.